US007742992B2

(12) United States Patent
Cronce

(10) Patent No.: US 7,742,992 B2
(45) Date of Patent: Jun. 22, 2010

(54) DELIVERY OF A SECURE SOFTWARE LICENSE FOR A SOFTWARE PRODUCT AND A TOOLSET FOR CREATING THE SOFTWARE PRODUCT

(75) Inventor: Paul A. Cronce, San Jose, CA (US)

(73) Assignee: Pace Anti-Piracy, San Jose, CA (US)

( * ) Notice: Subject to any disclaimer, the term of this patent is extended or adjusted under 35 U.S.C. 154(b) by 1998 days.

(21) Appl. No.: 10/080,639

(22) Filed: Feb. 21, 2002

(65) Prior Publication Data

US 2003/0156719 A1 Aug. 21, 2003

Related U.S. Application Data

(63) Continuation-in-part of application No. 10/072,597, filed on Feb. 5, 2002.

(51) Int. Cl.
*G06F 21/00* (2006.01)
(52) U.S. Cl. .............................. 705/59; 705/67; 705/51
(58) Field of Classification Search .................. 705/51, 705/59; 713/156
See application file for complete search history.

(56) References Cited

U.S. PATENT DOCUMENTS 5,864,620 A 1/1999 Pettitt

| 6,611,812 | B2 * | 8/2003 | Hurtado et al. ................ 705/26 |
| 6,898,706 | B1 * | 5/2005 | Venkatesan et al. ......... 713/167 |
| 6,904,523 | B2 * | 6/2005 | Bialick et al. ................ 713/156 |

* cited by examiner

*Primary Examiner*—Andrew J. Fischer
*Assistant Examiner*—Chrystina Zelaskiewicz
(74) *Attorney, Agent, or Firm*—Virtual Law Partners LLP

(57) ABSTRACT

A method for delivery of a licensed toolset to a software publisher for creating license-managed software products is disclosed. The method comprises providing an authorization process, and implementing the authorization process for both a toolset publisher and related toolset and a software publisher and related software product, whereby the same authorization process is used to obtain respective licenses. The authorization process includes creating a first public and private key pair for the software publisher, creating a second public and private key pair for the software product, creating an authorization program for the software program, with embedded copies of the first and second public keys, and combining the software program and the authorization program, such that when the authorization program is invoked, the authorization program obtains a license for controlling the use of the software program. The license is obtained by creating a license request, encrypting the license request using the second private key, transmitting the license request to a key authority, receiving a license from the key authority with license terms, decrypting the license, and using the license terms to control the use of the software program.

14 Claims, 13 Drawing Sheets

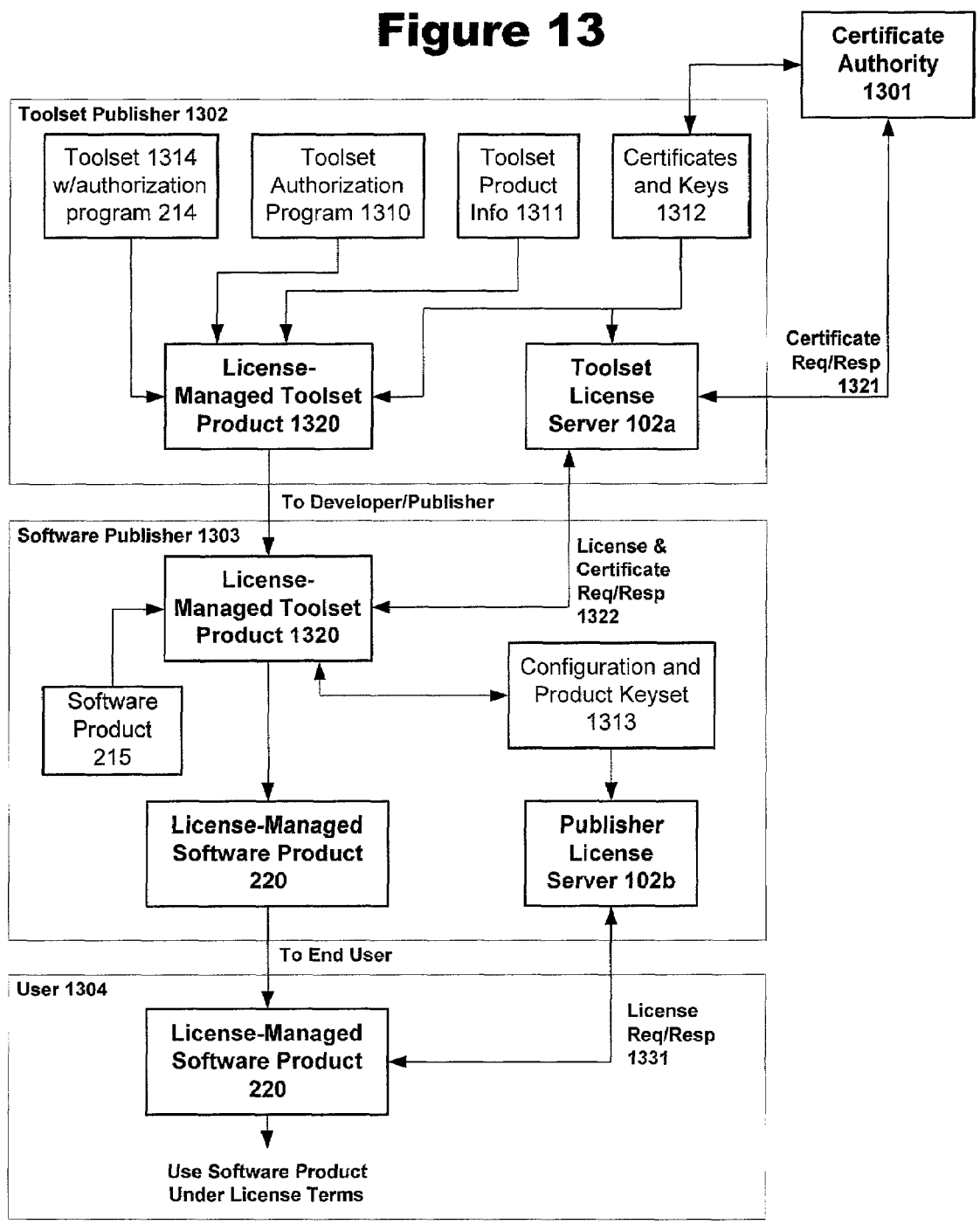

DELIVERY OF A SECURE SOFTWARE LICENSE FOR A SOFTWARE PRODUCT AND A TOOLSET FOR CREATING THE SOFTWARE PRODUCT

CROSS-REFERENCE TO RELATED APPLICATIONS

The present invention is related to application U.S. Ser. No. 10/072,597, entitled "Method and System For Delivery Of Secure Software License Information" filed on Feb. 5, 2002, and assigned to the assignee of the present invention.

FIELD OF THE INVENTION

The present invention relates to licensing of software, and more particularly to the delivery of a secure software license for a software product and a toolset for configuring the software product to use the software licensing process for the purpose of controlling licensed software usage.

BACKGROUND OF THE INVENTION

Software licensing has been used for some time in the software industry as a means of controlling use of software, and more particularly, for the purpose of limiting or eliminating unauthorized use of software, known as software piracy.

The resulting economic dislocation that occurs due to software piracy is severe. As the cost of developing and supporting software programs increases, the need to reduce piracy grows. One of the key elements of reducing software piracy is through the use of an electronic software license, delivered to the authorized user to enable the software program to operate. The electronic license includes the required information in a form that is understood by the software program, and contains license terms.

License terms are the terms that apply to the use of the particular copy of the software program, and can include a start date, an end date, a number of program launches, fingerprint information to limit use on a specific local area network or on a specific machine, and other controlling information. For increased security, the electronic software license may be encrypted to hamper hacker efforts to bypass its function. This requires that the software program contain a decryption key to decrypt the license before extracting the information required.

Since the runtime environment for the software program and its authorizing code is typically unprotected, such as with Microsoft Corporation's Windows Operating System, and a large number of programmers have extensive knowledge of programming on such a system, it is difficult to effectively protect software running on such machines. All one can do is increase the difficulty of bypassing the electronic license functionality, but without significant inconvenience to the user or to the software developer, the reseller, or to technical support for the software program.

Previous efforts to authenticate a software license have used techniques such as "challenge/response" to deliver the required information to the electronic license on the user's machine. These often have been encoded in a series of alphanumeric characters to make it easy to deliver the challenge and receive the response, such as by phone, or by email, where direct web delivery is not practical. This method requires the user to copy and paste, type, or read the challenge, depending on the communication means used to deliver the challenge, and likewise to copy and paste (or type in) the response. For very small responses, this is not too difficult. However, as the required content of the response increases with increasing complexity, this becomes unwieldy and inconvenient for the user. One of the increases in complexity comes from the use of digital signatures, which are desired to improve security.

An important factor in delivery of a solution to these problems is a toolset that can be used by the software product developer/publisher to convert his software product into a "license-managed" product with minimum effort and complexity. The step of licensing the toolset to the developer represents a challenge to the security of the licensing system. Specifically, it is possible for the software hacker intent on breaking the licensing system to purchase a copy of the toolset for the purpose of reverse-engineering the toolset to help in the hacking process. Thus, what is needed is a method for insuring the identity of the toolset purchaser for the purpose of denying access to the toolset by known hackers or individuals with no known software products and suspicious intent.

This problem extends to the purchasers of the license-managed software products, as well. Specifically, a hacker can purchase a copy of the license-managed software for the purpose of reverse-engineering the licensing system. If a successful hack is created to bypass the license terms, such that copies of the software product can be freely (but illegally) distributed, there is often no way to determine the origin of the software hack, i.e., the identity of the person who purchased the software product.

Accordingly, what is needed is a toolset to enable software developers or published to easily convert their unprotected software products, such as programs or software resources, including clip art or fonts, to "license-managed" software products. This toolset should use a similar secure licensing system to the one it generates for the license-managed software product. In other words, the toolset ideally should use the same mechanisms to provide licenses for its own use as it provides for use with the developer/publisher product. This licensing system should establish a secure identity link from the end user all the way back to the toolset provider for the purpose of accurately identifying the individuals within the chain, such that the source of the hack can be traced back to either the software publisher or end user, to assist in the effort to stop the illegal activities. The present invention addresses all of these needs.

SUMMARY OF THE INVENTION

A method for delivery of a licensed toolset to a software publisher for creating license-managed software products is disclosed. The method comprises providing an authorization process, and implementing the authorization process for both a toolset publisher and related toolset and a software publisher and related software product, whereby the same authorization process is used to obtain respective licenses. The authorization process includes creating a first public and private key pair for the software publisher, creating a second public and private key pair for the software product, creating an authorization program for the software program, with embedded copies of the first and second public keys, and combining the software program and the authorization program, such that when the authorization program is invoked, the authorization program obtains a license for controlling the use of the software program. The license is obtained by creating a license request, encrypting the license request using the second private key, transmitting the license request to a key authority, receiving a license from the key authority with license terms, decrypting the license, and using the license terms to control the use of the software program.

According to the method disclosed herein, the present invention provides a flexible and extensible method for delivering license terms to software program and toolset users that is easy to use and not prone to user errors. In addition, the present invention addresses the toolset requirements to provide the mechanism for creating license-managed software products, and the need for ensuring a secure identity link to the purchaser of the software product.

BRIEF DESCRIPTION OF THE DRAWINGS

FIG. 13 is a flow diagram showing the entire chain from the creation of the toolset to the end user acquiring a license for a software product.

DETAILED DESCRIPTION

The present invention relates to a method and system for delivering a secure software license for a toolset for creating licensed-managed software products, where one software license is used to authorize use of the toolset, including the generation of delivered secure licenses for the generated software product. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

Figure 1:
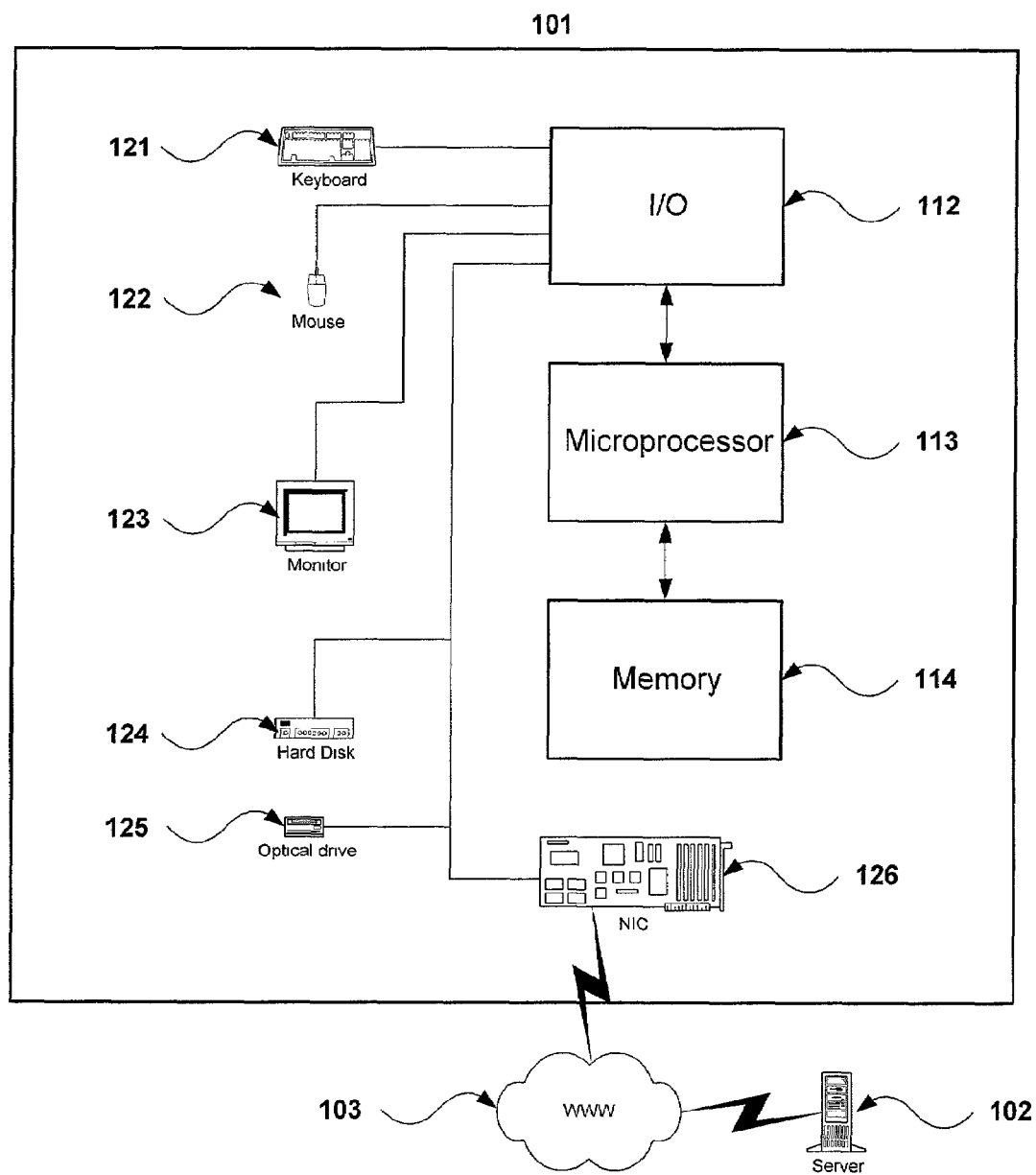
FIG. 1 is a block diagram of the system of the present invention comprising a computer system and server connected via a network connection

Referring to FIG. 1, a block diagram of the operating environment of the present invention is shown that includes a conventional computer system 101 and server 102 connected via a network connection 103. The computer system 101 comprises a microprocessor or CPU 113, memory 114, and I/O circuitry 112. The I/O circuitry 112 is typically connected to various subsystems, such as a keyboard 121, a mouse 122, a monitor 123, one or more hard disk drives 124, an optical drive 125 such as a CD-ROM, CD-R/W, or DVD drive, and one or more interface cards, such as NIC (Network Interface Card) 126. Many variations of a computer system 101 capable of supporting the operation of the present invention are well known to those with ordinary skill in the art, and thus will not be described herein.

The network card 126 or its equivalent connects the computer system 101 to a network 103. Also connected to the network 103 is a back-end server 102. The network can comprise the worldwide web, as shown in FIG. 1, or can be a local area network (LAN) or wide area network (WAN) of a different sort. Network access may be wireless or wired. A back-end server, referred to as license server 102 and preferably controlled by a key authority, provides the functionality of creating software licenses as described herein. Alternate embodiments for the back-end server configuration include a computer system used by an operator, where manual intervention is required.

Figure 2:
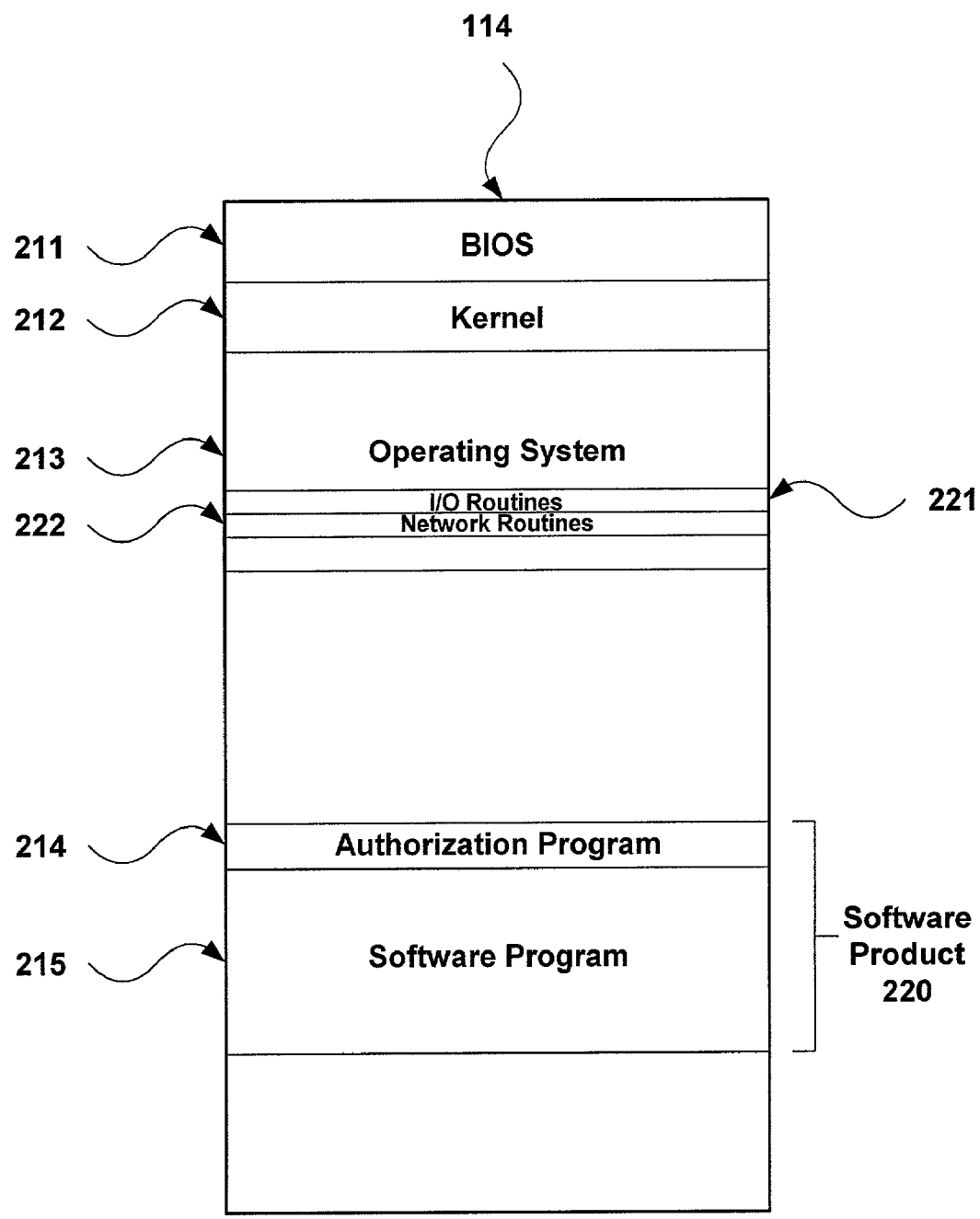
FIG. 2 is a block diagram of the software on the computer system to implement the present invention.

Referring now to FIG. 2, a block diagram of the software on the computer system 101 to implement the present invention is shown. FIG. 2 shows a typical configuration of the software product 220 loaded into memory 114 of computer system 101. The operating software of the computer system 101 comprises the BIOS 211, the Kernel 212, the Operating System 213, and included with the Operating System 213 are I/O Routines 221 and Network Routines 222. The Network Routines 222 in conjunction with the I/O Routines 221 are used to enable the functionality of the NIC 126 for communicating over a network 103. The function of these software components is well known by those of ordinary skill in the art, and thus will not be discussed in detail herein.

A user loads a software product 220 on the computer 101, the license for which is distributed and managed as disclosed herein. The software product 220 includes an authorization program 214 and a software product 215. The software product 215 provides the desired functionality of interest to the user, or a resource of interest to the user, such as a piece of clip art, a music clip, or a font. The authorization program 214 is responsible for requesting a license for the software product 215 from the license server 102, validating the license, and for managing the use of software product 215 according to the license terms within the license, described below.

The software product 215 and its associated authorization program 214 is loaded into memory 114 when the user invokes the software product 220 using the user interface of the computer system 101. By design, the authorization program 214 runs first, and, depending on the presence of a valid license, will control the operation of the software product 215 appropriately.

Figure 3:
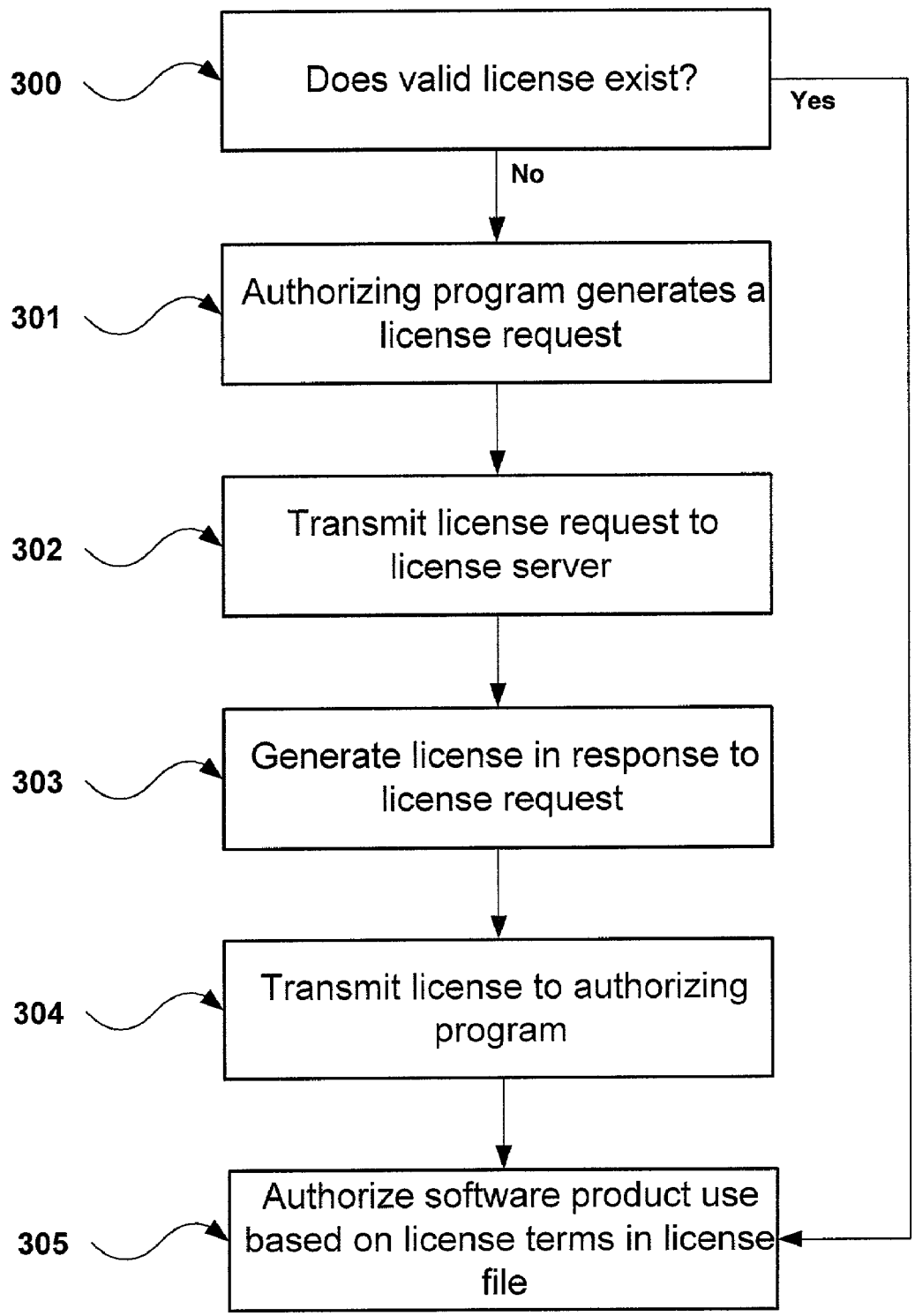
FIG. 3 is a flow diagram for the process of delivering secure license information to a software program.

Referring now to FIG. 3, a flow diagram for the process of delivering secure license information to a software product 215 is shown. The process begins with step 300, where the authorization program 214 checks to see if a valid license exists. If one does exist, the process continues with step 305. If no license is found, the authorizing program 214 generates a license request in step 301. This process is described below in detail in association with FIG. 6. This license request in the preferred embodiment is in the form of a signed XML document, and will be described in detail below in association with FIG. 7.

An alternate embodiment is to encrypt the license request using the product public key, rather than signing the license. In this case, the product private key is not included within the authorizing program 214, since the trust relationship described below established by the use of certificates is not in effect. In this embodiment, security is established by maintaining the privacy of the private keys.

Next, in step 302, the license request is transferred to the license server 102. The path to the license server 102 is through the network 103 connecting the computer system 101 and the license server 102. However, as those of ordinary skill in the art are aware, more complex arrangements are possible, with multiple network layers as well as multiple server layers. All are within the scope of the present invention. Also, the invention does not require that the license request be transmitted over a network, but only that the license request be delivered to the license server. This can include use of email, a floppy disk, a telephone call to the publisher, wireless communications, or even a printed page, for example. The license request is preferably in the form of a document. Any method of delivery of a request for a license is within the scope of the invention.

For example, a user may purchase a software product, and contact the software publisher to request a license. The publisher would collect information from the user over the phone, and use the information as a license request. The publisher might offer additional features for additional cost during the phone contact. After the call completes. The publisher generates a license as described below, including license terms and optionally user information and transmits it to the user. The preferred embodiment for delivery of the license in this case is to collect the user's email address, and attach the license to an email, with instructions in the email body on how to apply the license to the software product. Email is the preferred embodiment in this case since this is the easiest way to transmit a file to a computer when you do not have an established connection with the computer, as described above for the preferred embodiment for generating a license request.

In step 303, the license request is received by the license server 102, and processed into a suitable license for the software product 215. This process is described below in association with FIG. 8. In one alternate embodiment, where the license request was encrypted with the product public key rather than signed, the license request must be decrypted with the product private key prior to processing. In this same alternate embodiment, the license response is encrypted using the publisher's private key before being transferred back to the authorizing program.

In an alternate embodiment, a license may be generated automatically during product generation by the publisher without receiving a license request from the user. In this case, the license contains no user information or machine fingerprint, but does contain license terms. For example, the software may be sold with a license for basic features and a demo period for full features, whereby the user can decide during or after the demo period to purchase the upgrade. The user may never choose to purchase the upgrade, and thus operate on the included license only. Another example is to offer a free download with a demo license, wherein the software works fully enabled for a defined period of time. At the end of the demo period, the software might revert to basic operation or no operation, depending on license terms. The user may choose to purchase the license to full use or partial use either during the demo period or after. In these examples, where a user chooses to purchase an upgraded license, a new license is generated according to the present invention. Specifically, a license request is generated as described above.

Next, in step 304, the license generated in response to the license request is transferred back to the authorizing program 214. This transfer can also utilize all of the mechanisms suggested for step 302 above. In order to preserve ease of use, however, the delivery is preferably in electronic form rather than paper. Otherwise, the effort required by the user to enter the license by typing would be excessive and not acceptable.

In the preferred embodiment shown in FIG. 1, the transmission of the license request and license in steps 302 and 304 respectively are done automatically using an existing network connection 103. Thus, there is very little delay in the process of enabling the use of the software product 215 once loaded onto computer system 101. It is critical for acceptance of any licensing system that it is as simple, fast, and as streamlined and automatic as possible. A network connection 103 to the license server 102 achieves these goals. Of course there are many other situations, including technical support situations, or where no network connection exists, where other methods are preferred and can be used according to the present invention.

Finally, in step 305, the authorization program 214 validates the license in detail, and uses the contained license terms and other information within the license to control the use of the software product 215. The process of validating the license is described below in association with FIG. 10. The licensed control of use of software product 215 is by various license terms, such as license start and end dates, number of program launches, features allowed and disallowed, etc. One of the limitations can even be as restrictive as only allowing the software product 215 to run on a specific machine. Various methods of limiting or controlling use of the software product 215 have been used. License terms and license management methods are well known to one of ordinary skill in the art, and will not be covered in detail herein.

In an alternate embodiment, where the license response has been encrypted rather than signed, the validation is in the form of successfully decrypting the license using the publisher's public key. The use of two separate key sets, one for license requests and a separate one for license responses increases the security of the system.

One of the underlying technologies used extensively in the present invention is a digital certificate and a digital signature. The digital certificate and signature are components of a trust-based system incorporating a certificate authority (CA) and the use of public/private encryption keys and message digest algorithms. The public/private encryption keys allow secure communications and delivery of tamperproof documents. The private key is used to encrypt, and the public key is used to decrypt, or vise versa. The public and private keys are mathematically related, but one cannot be derived from the other. Thus, if you encrypt with the public key—typically widely available—only the owner of the private key can decrypt. Alternatively, if the private key owner encrypts with his private key, anyone with his public key can decrypt, with the knowledge that the private key owner is the originator of the encrypted data. It is critical for security that the private keys remain private and in the control of the key owner.

An entity that has access to a private key is referred to as a key authority. Thus, the key owner is a key authority for his key set. In addition, the private key owner may provide his private key to another entity for the purpose of handling transactions. In this case, the other entity is a key authority for the owner's key set as well.

Digital signatures are created using message digest algorithms. A message digest algorithm is used to generate a unique number, known as the message digest, from any document. The likelihood of any two documents having the same message digest is extremely small, and thus can be considered to be completely unique for practical application. The original message cannot be recovered using the message digest. A common message digest algorithm is the MD5 algorithm from RSA.

The use of digital signatures has become standard for identifying the originators of information. A digital signature comprises a digest of the message that is signed, i.e., encrypted using the private key of the originator. Verification of the accuracy of the message and the identity of the originator is accomplished by decrypting the message digest, computing a digest on the message, and comparing the two message digests. If they are the same, the message is intact, and the identity of the signer can be determined as the owner of the private key associated with the public key used to decrypt.

The digital certificate is used to verify the identity of the owner of a public key. The certificate is created by the owner sending the public key to a certificate authority, as a request for a digital certificate. The certificate authority investigates the owner to ensure correct identity information is associated with the certificate. Once the owner's identity has been verified, the certificate authority issues a certificate. This certificate is essentially the owner's public key and identification, plus the certificate authority identification, all signed by the certificate authority private key, and thus verifiable using the certificate authority public key. It is the trust in the certificate authority and their identity verification, plus the signing by the certificate authority private key that validates the certificate, and thus the identity of the signer on a digital document.

Figure 4:
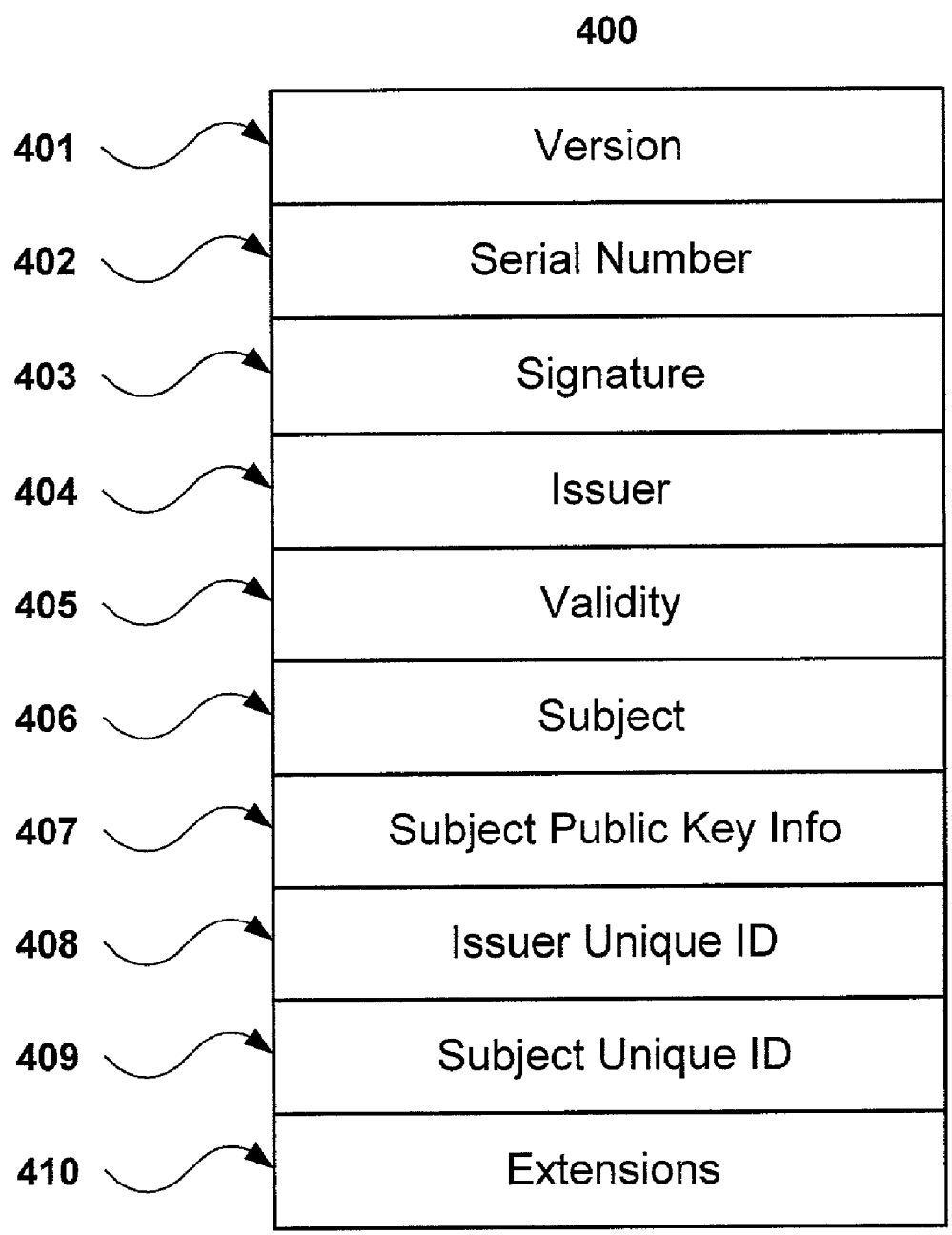
FIG. 4 is a block diagram of a digital certificate.

Referring now to FIG. 4, a block diagram of a digital certificate for use in accordance with the present invention is shown. The "issuer" 404 refers to the certificate authority generating the certificate, and who is guaranteeing the identity of the subject. The "subject" 406 is the owner of the certificate, and whose identity the issuer has verified. This identity is used to verify the originator of signed documents.

Key components of the certificate include the digital signature 403 of the certificate, signed by the issuer, the issuer 404 name along with the issuer unique ID 408, the public key of the subject 407, the subject name 406, and certificate extensions 410. Extensions 410 allow any issuing authority to define additional information within the standard certificate format, and are used as part of the present invention, described below.

The subject's certificate 400 is signed by the certificate authority (CA) using the certificate authority private key. The resulting certificate can be used, in conjunction with the CA certificate, to validate the contents of the certificate, including all fields, such as the subject name and subject public key. The CA certificate—widely available on the Internet—is used to retrieve the CA public key. Thus, it is the trust in the CA that validates the certificate 400 and subject public key, and therefore validates of the originator of a document signed by the certificate 400 owner. Digital certificates, signatures, and public/private keys are well known by one of ordinary skill in the art, and therefore will not be described in more detail herein.

Figure 5:
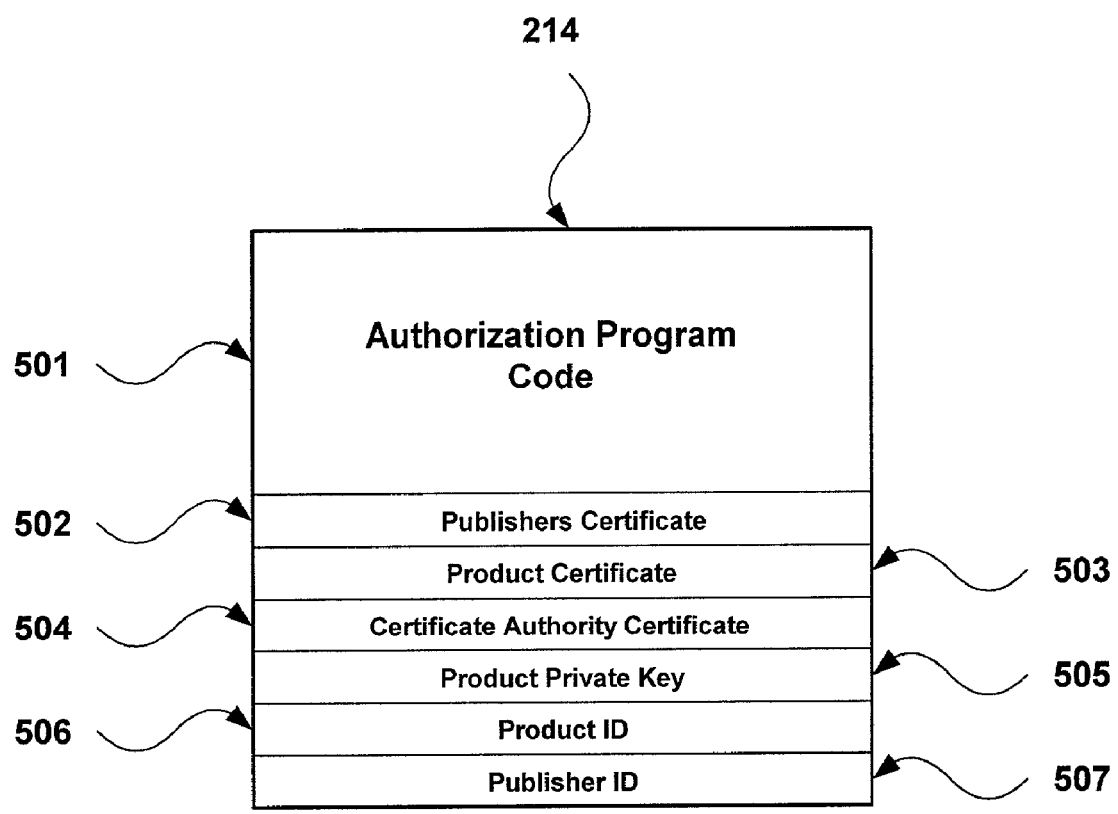
FIG. 5 is a block diagram of the authorization program showing the required information embedded within the program for use in generating the license request.

Referring now to FIG. 5, a block diagram of the authorization program 214 is shown, illustrating the required information embedded within the program for use in generating the license request according to a preferred embodiment of the present invention. Authorization program 214 includes the actual executable program code 501 for authorizing and controlling use of the software product 215. Embedded within the authorization program 214 are the following:

1. The software publisher's digital certificate 502, signed by the CA.
2. A software product digital certificate 503 associated with this software product 215 that contains the public key of the product keyset and is signed by the publisher's private key associated with the publisher's digital certificate 502.
3. The CA digital certificate 504.
4. The product private key 505 associated with the software product digital certificate 503,
5. The product ID code 506 assigned by the software publisher.
6. The publisher ID 507 assigned by the CA is also embedded in the extensions object 410 of the publisher's certificate 502.

This information is used to create the license request, described in conjunction with FIG. 6 and FIG. 7 below. The information is also used to validate a license, described in conjunction with FIG. 7 and FIG. 8 below.

Figure 6:
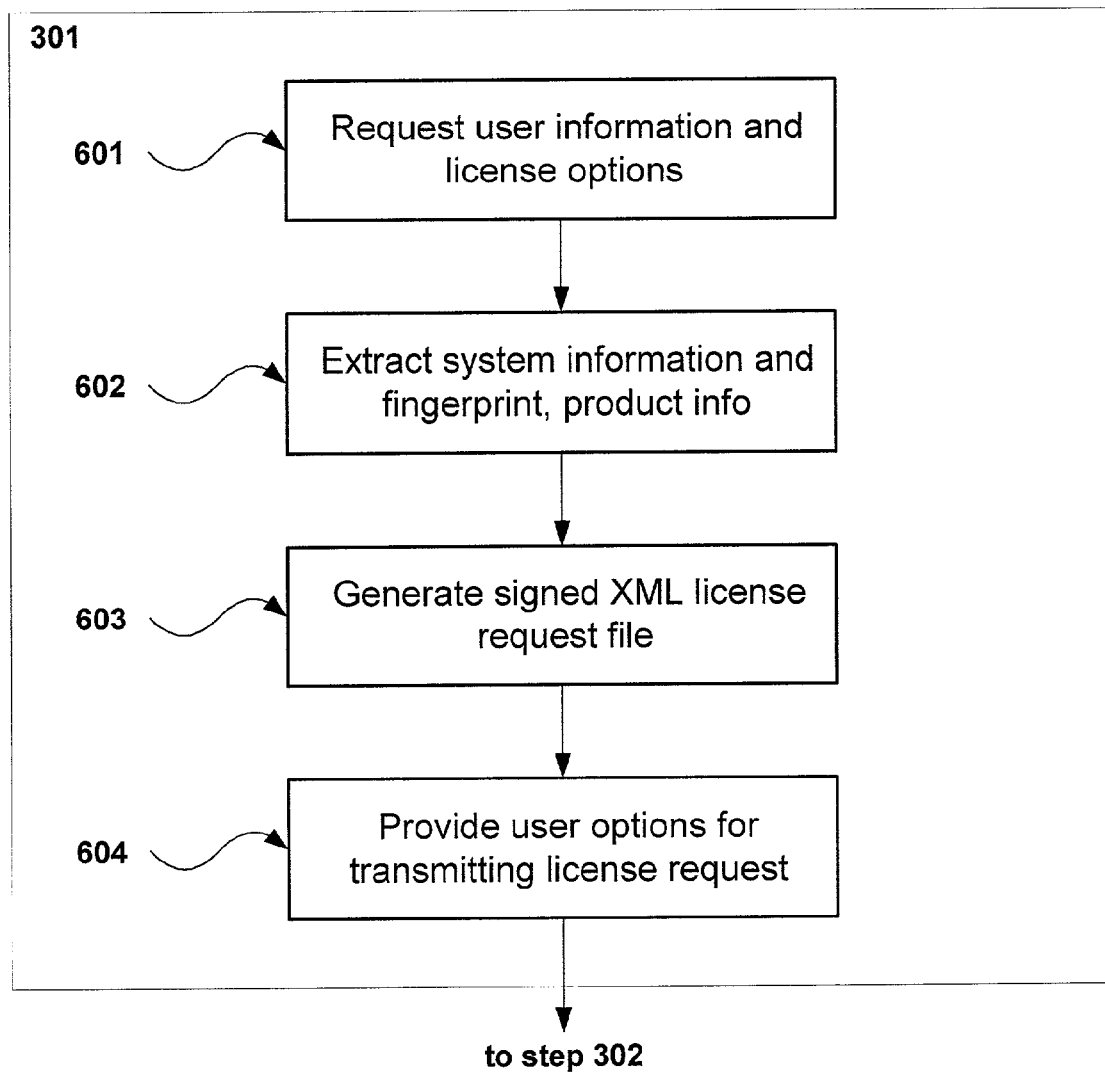
FIG. 6 is a flow diagram for license request generation by the authorization program.

Referring now to FIG. 6, a flow diagram for license request generation by the authorization program 214 is shown. This is the detailed diagram for step 301 in FIG. 3. In step 601, user information and license options are requested. Typically, this is done on the first invocation of a newly installed program, and includes one or more dialog boxes for the user to fill out, specifying information such as name, address, etc. In addition, if various options for use are supported, such as demo version, or basic vs. pro version, etc., the user will be asked to select the desired options. In some cases, a demo mode is assumed, often with a specific period of time, such as 30 days, and the user information gathering process is only started if the user decides to purchase the software, in order to turn on the features that are inhibited in demo mode, or to be able to use the software program after the demo period expires. It is at this stage where purchase information may be requested, such as credit card information. Alternatively, the user may be sent to a website to complete the financial transaction component of the licensing process. A key factor in the security of this process is to tie the financial transaction with the license request, rather than to the distribution of the software product itself.

A different embodiment is to sell the software through retail channels, and then require registration using the present invention. In this case, the financial transaction has already occurred. Typically, in this case, a serial number or other unique identification is required during the registration process, along with the user name, address, email, phone number, etc. However, in this case, this information cannot be verified through the credit card transaction.

Another approach to the license process is to fully license a demo version, but not associate it with a financial transaction, as described above. In this case, the user information is collected, and the license request/response process described herein is executed. The license response document will include license terms indicating limited use, defined by the software publisher. If the user decides to purchase the program at a later time, the request/response cycle is repeated—but this time, a financial transaction is involved, as described above. The new license response contains different license terms, and enables the product to function without the demo limitations. This process can extend to more powerful versions, such as a Pro version, for example. In this case, the user can move from the demo version to the standard version and later to the pro version, or could go directly from demo to pro version. The user could even decide to purchase the program without a demo, and go directly to either the standard or pro version. In all cases, the financial transaction is associated with the receipt of the request and the generation of the response for a functional license (a functional, non-demo license).

This association of financial transaction and functional license generation is key to preventing misuse of the license request/response system. If functional (non-demo) licenses could be requested without a financial transaction, it would be possible to generate free licenses by extracting the product private key from the authorization program 214. With the association, even if you do extract the private key, it still costs you money to purchase a license with this system.

Next, in step 602, information is extracted from the computer system, including configuration, such as processor type, amount of memory, operating system version, etc. In the preferred embodiment, a computer fingerprint is also captured. A fingerprint can be created in a number of different ways. One way is to capture unique information from the host machine, such as CPU serial number (if available), hard drive serial number, MAC address of the network card, etc. This information can then be digested using the message digest algorithm, resulting in a unique machine fingerprint. This can be used to prevent the program from running on a machine other than the machine requesting the license. Also available is the product ID 506 and publisher ID 507, along with the software product name and software publisher name. Other information may also be included, depending on the requirements set by the software developer/publisher.

In step 603, in the preferred embodiment, a signed XML file is created to represent the license request. Of course any type of digitally signed document can be used for this purpose. The value of using the proposed signed XML standard is the support for various tools that exists for the standard that would not be available if a proprietary format was used. In addition to the information collected in steps 601 and 602, the digital product certificate 503 and product private key 505 are used in generating the XML license request. The contents of the license file are described below in detail in conjunction with FIG. 7 below. The license request is digitally signed using the product private key 505. The product certificate 503, containing the product public key, is included within the XML document to enable verification at the receiving end.

Finally, in step 604, the user is given options for the transmission of the license request to the license server 102. In the preferred embodiment, if a network connection is detected, it is automatically used to connect with the license server 102 over the Internet. If no network connection is available, the user is presented with available options, such as using a dial-up modem, saving the file for sending with email at a later time, or writing the file to a floppy disk, optical disk, or compact flash card. It is even possible to select a paper printout for mailing, assuming the publisher was willing to accept the license request in that format, preferably for optical character recognition scanning into the back-end server 102. The license request is then generated in the selected format, and transmitted as appropriate, such that it arrives at the destination back-end server 102 in electronic form. The back-end server 102 is a key authority for the publisher, in that it has available to it the private publisher key associated with the publisher certificate 502.

Figure 7:
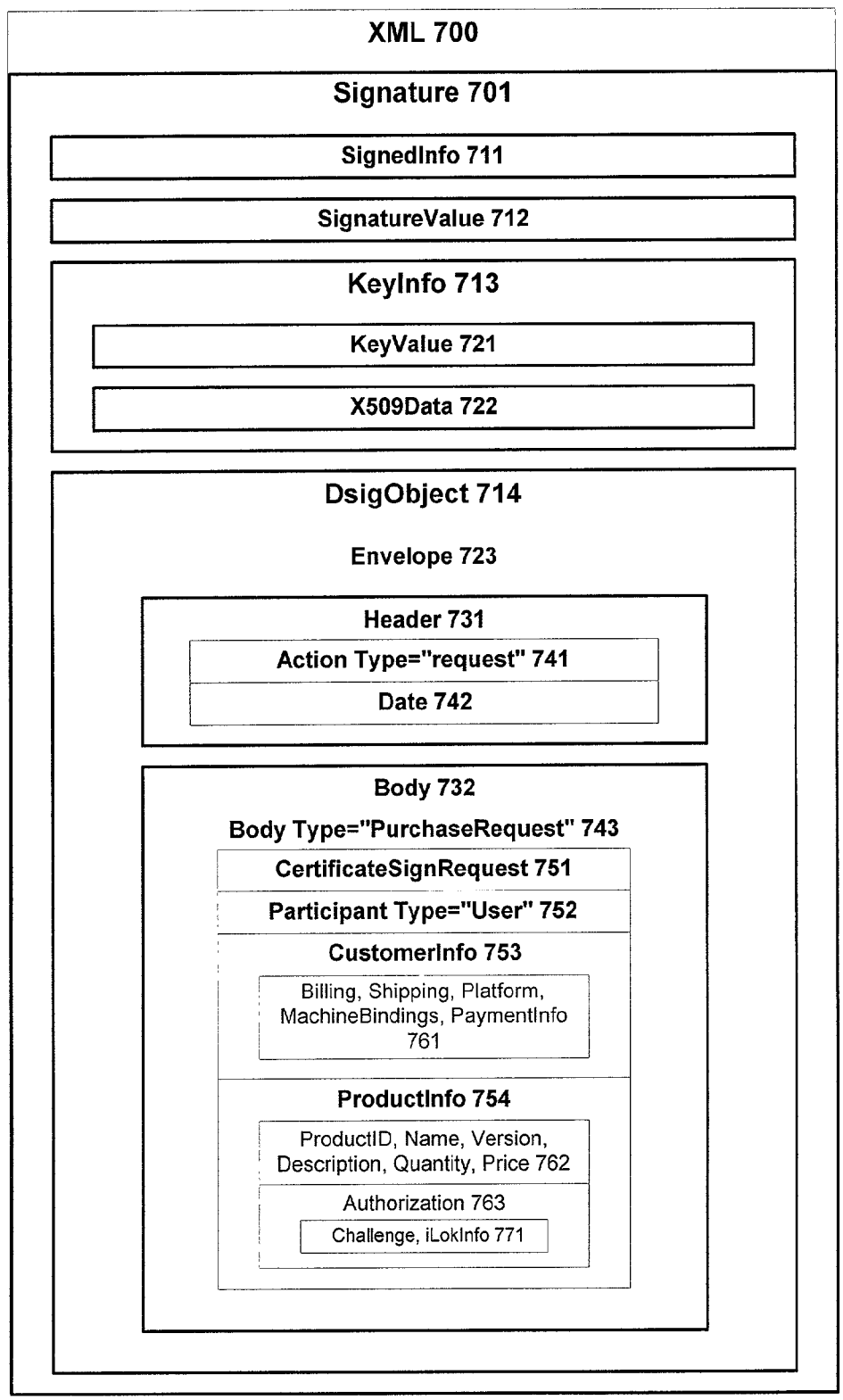
FIG. 7 is a block diagram of an XML license request generated by the authorization program.

Referring now to FIG. 7, a block diagram of the digitally signed XML license request 700 generated by the authorization program 214 in step 603 above is shown. The purpose of this diagram is to show the primary features relevant to the present invention, but not to show all the details within the proposed signed XML standard definition. The definition is widely available on the Internet, and is well known to those of ordinary skill in the art, and thus will not be included herein.

The XML object 700 comprises a single object, signature 701. Within the signature object 701 are four objects. It is the fourth object, DsigObject 714 that contains the unique message of the signed XML document, and for which the signature is applicable. Note that multiple DsigObjects can be included within the document, each with their own signatures.

The first object, SignedInfo 711, includes information about the signature used to sign the document, such as the algorithm used for canonicalization of DsigObject 714 prior to generating the message digest, the message digest algorithm used to generate the message digest of DsigObject 714, and the algorithm used to sign the document. Also included is the message digest itself, generated from the entire contents of DsigObject 714, including the tags bracketing the contents. The message digest is not encrypted. Rather, the message digests (more than one are possible) are signed, and the signature value is stored in the SignatureValue object 712. The signature is generated using the private product key 505.

Next is the KeyInfo object 713 that includes two other objects, KeyValue 721 and X509Data 722. KeyValue 721 specifies that this is an RSAKeyValue. The X509Data 722 is the public product certificate 503 that is in turn signed using the publisher's private key associated with the publisher's certificate 502. This product certificate 503 can be validated by license server 102 using the publisher's certificate 502. The following steps accomplish this validation:
1. Using the publisher's public key, decrypt the message digest in the product certificate 503 signature.
2. Generate a message digest of the certificate.
3. Compare the decrypted message digest and the generated message digest. If they are the same, the contents of the certificate have been validated.

Using this same procedure, the publisher's certificate 502 can also be validated, but this time the CA certificate must be used, since it was the CA who signed the publisher's certificate 502. This sequence of validations ties the license request 700 back to the trusted certificate authority. The process of using and verifying digital certificates and digital signatures is well known by those of ordinary skill in the art, and will not be discussed in more detail herein.

The validated product certificate 503 can next be used to validate the message digest signature within the SignatureValue 712, by using the contained product public key, following steps similar to the three steps given above. Specifically:
1. Using the product public key from the product certificate 503, decrypt the message digest in the Signaturevalue 712 signature.
2. Generate a message digest of SignedInfo 711
3. Compare the decrypted message digest and the generated message digest. If they are the same, the contents of the message digest(s) in SignedInfo 711 have been validated.

Once this has been done, an additional step is required:
4. Generate a message digest of DsigObject 714 and compare it with the message digest in SignedInfo 711. If it is the same, the contents of DsigObject 714 have been verified, and a chain of known identities has been established back to the CA.

If more than one message digest exist, step 4 must be repeated for each object related to a separate message digest.

It is important to note that the product private key 505 is somewhat susceptible to discovery, since it is embedded in the authorizing program 214. If this key is compromised, it would allow generation of valid license requests. However, since license requests are processed in conjunction with a financial transaction involving payment for use of the product, it is not a serious issue, as described above. That is to say, if someone generates such a license request, they must pay for any license generated, and thus, have not achieved anything.

Also, since they must submit payment typically via a charge card, their identity can be verified.

This technique of creating a public/private keyset and certificate for the purpose of generating license requests is used to protect the more important private keys related to the CA certificate 504 and the publisher certificate 502. These private keys are very securely protected and only available for use by the CA or the publisher.

Continuing with FIG. 7, the DsigObject 714 contains the actual license request information. This is contained within an envelope object 723 that in turn contains a header object 731 and a body object 732. The header object 731 includes an action type "request" 741, and the date 742. As will be seen below, the action type can contain different values, such as "Response" for example.

The body 732 also includes a body type "PurchaseRequest" object 743. Within this object are various objects defining the license request particulars. First is the CertificateSignRequest 751. For a license request from an end user of the software product 215, this is empty. The use of this object will be described below in conjunction with FIG. 11 and FIG. 12, when providing a certificate for the software publisher as part of the license process for the toolset used to automate the creation of license-managed software products.

The next object ParticipantType 752 defines the participant type as User. Other participant types can be defined, such as Publisher, for example. However, for a license request from the end user of software product 215, this object defines the participant as user.

The next object, CustomerInfo 753, contains a number of objects 761 related to the customer, such as the billing address, shipping address, platform (computer type), machine bindings (fingerprint of the machine making the license request), and payment info (credit card info, for example).

The last object is ProductInfo 754. ProductInfo 754 contains a number of objects 762 related to the software product 220 including the Product ID code 506, product name, product version, product description, quantity purchased, and price. Also within ProductInfo 754 is the authorization object 763. This object contains optional information such as a digital challenge, serial numbers, etc. Another object is the iLokInfo object 771. iLokInfo 771 contains information about a security "dongle" if associated with the use of the product. The iLokInfo object 771 can optionally contain a digital "challenge" to the server 102 that must be converted to an appropriate digital "response" in the license document. This digital response can be used, in effect, to authenticate the use of the software product once transferred and accepted by the dongle. In this case, it is possible to use only the dongle to authenticate the software product rather than the license response. Alternatively, both can be used for authentication.

Figure 8:
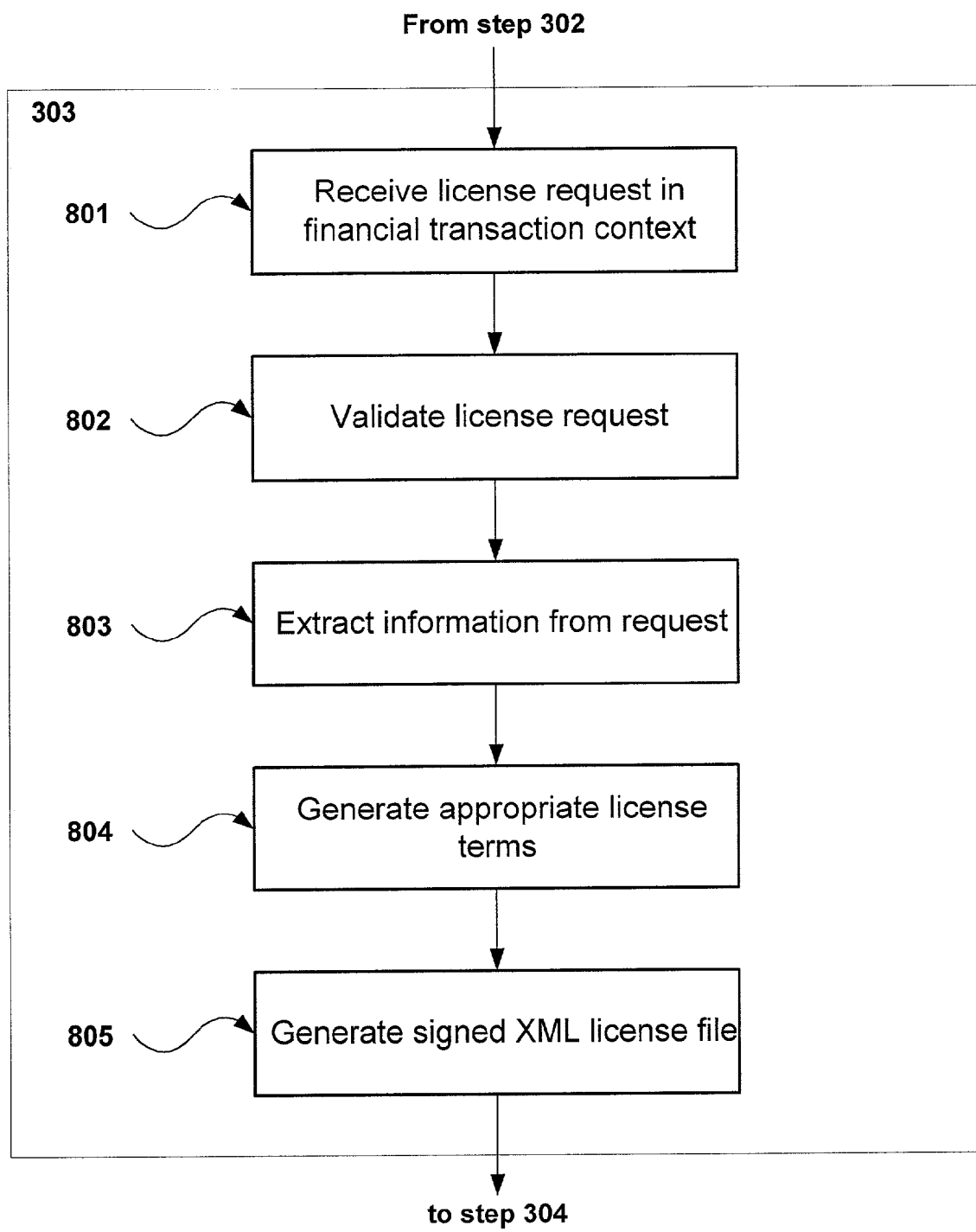
FIG. 8 is a flow diagram of the process for handling a license request by the license server, and generating a license.

Referring now to FIG. 8, a flow diagram of the process for handling a license request 700 by the license server 102, and generating a license is shown. This flow diagram is a detailed description of step 303 in FIG. 3, and begins in step 801 by receiving the license request 700 in conjunction with a financial transaction at the license server 102. Next, the license request 700 is validated in step 802 as described above. Specifically:

1. The product certificate 503 is validated using the publisher's certificate 502.
2. The publisher's certificate 502 is validated using the CA certificate.
3. The signature of the document contained in SignatureValue 712 is validated, using the product certificate 503.
4. The message digest of the DsigObject 714 is validated, using the specified message digest algorithm.

In step 803, information is extracted from the license request 700 to be reused in the license to be generated. Information extracted preferably includes CustomerInfo 753 and ProductInfo 754. Next, in step 804, appropriate license terms are created, based on the purchase transaction and information contained in CustomerInfo 753 and ProductInfo 754.

Finally, in step 804, a response document 900 is generated. This response document 900 is the actual software license document, and takes a similar form to the license request document 700. The differences between the response document 900 and the license request document 700 will be described in detail in conjunction with FIG. 9 below.

Figure 9:
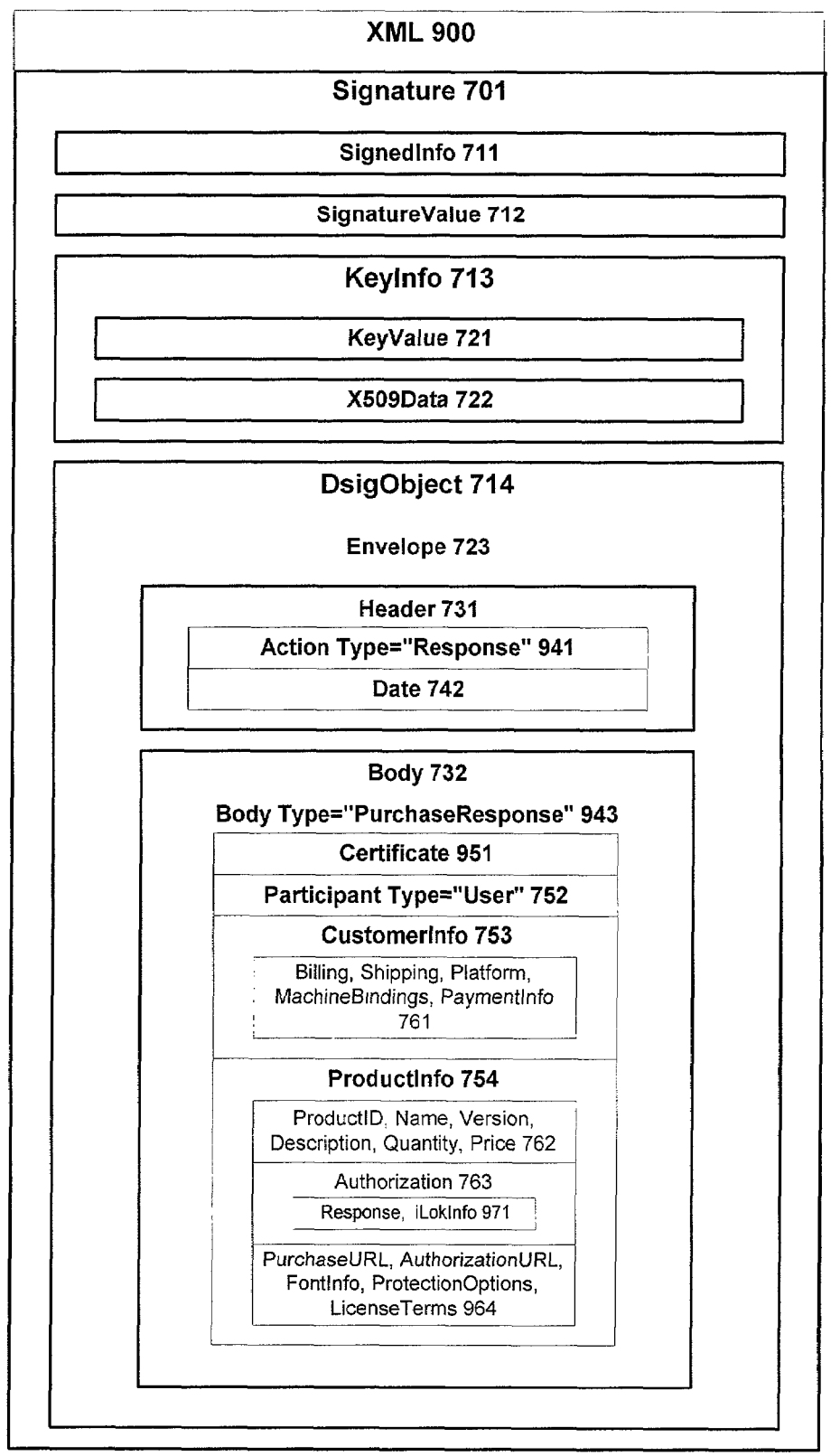
FIG. 9 is a block diagram of the XML license generated by the server.

Referring now to FIG. 9, a block diagram of the XML license response document generated by the server 102 is shown. This signed license response document 900 takes the same form as the license request 700, with changes in the DsigObject 714. The response document 900 is signed by the publisher's private key, associated with the publisher's certificate 502. This is possible because the server 102 is provided by a key authority for the publisher. As is well known by those skilled in the art, other arrangements are possible, such as the server 102 being supplied by the certificate authority, for example, or the server 102 being part of a multi-tiered solution involving distributors and dealers and their respective servers.

Other than the difference in the signer, and therefore the difference in the enclosed certificate in the X509Data 722, the changes between the request 700 and response documents 900 is concentrated in the DsigObject 714. The first difference of note is the new action type "Response" in the ActionType 941 object. This object is similar to ActionType 741 in the request document 700.

The next difference is in the BodyType 943, defined as a "PurchaseResponse" rather than a "PurchaseRequest" as with BodyType 743 in the request 700.

The Certificate 951 object replaces the CertificateSignRequest 751 object, and may include a copy of both the CA certificate and the publisher's certificate, signed by the CA. This inclusion of certificates allows validation of the license without requiring additional information from an outside source. Normally, however, these certificates are also included within the authorization program 214, and therefore are optional in the license itself.

If a challenge was included in the Challenge or iLokInfo 771 object, the response is embedded in the Challenge or iLokInfo 971 as shown. Additional objects 964 are added, including various URL's for tracking the order process, FontInfo for controlling font usage (if the licensed software object is actually a font rather than a software program), ProtectionOptions, and LicenseTerms. LicenseTerms may include objects such as Features, DeveloperData, ExpirationDate, StartDate and other terms. Also included in this section is NodeLocked, a Boolean value. If true, the license restricts use of the software product 215 to the machine the license request was generated on.

The license response document 900 is a highly secure document that cannot be changed without invalidating the entire license. Prior to allowing the use of software product 215, the document 900 is validated in a similar manner to the process of validating the request document 700.

As described above, the response to a challenge from a dongle (iLok) device may be included within the response document 900, and may include within it not only authorization, but license terms or other authorization information. This may be used to complete the registration/authorization process for the software within the dongle device. In this case, one embodiment is to solely use the dongle device to authorize the use of the software product 220, including license terms. Alternatively, both the license and the dongle may be used to authorize the software product 220.

Figure 10:
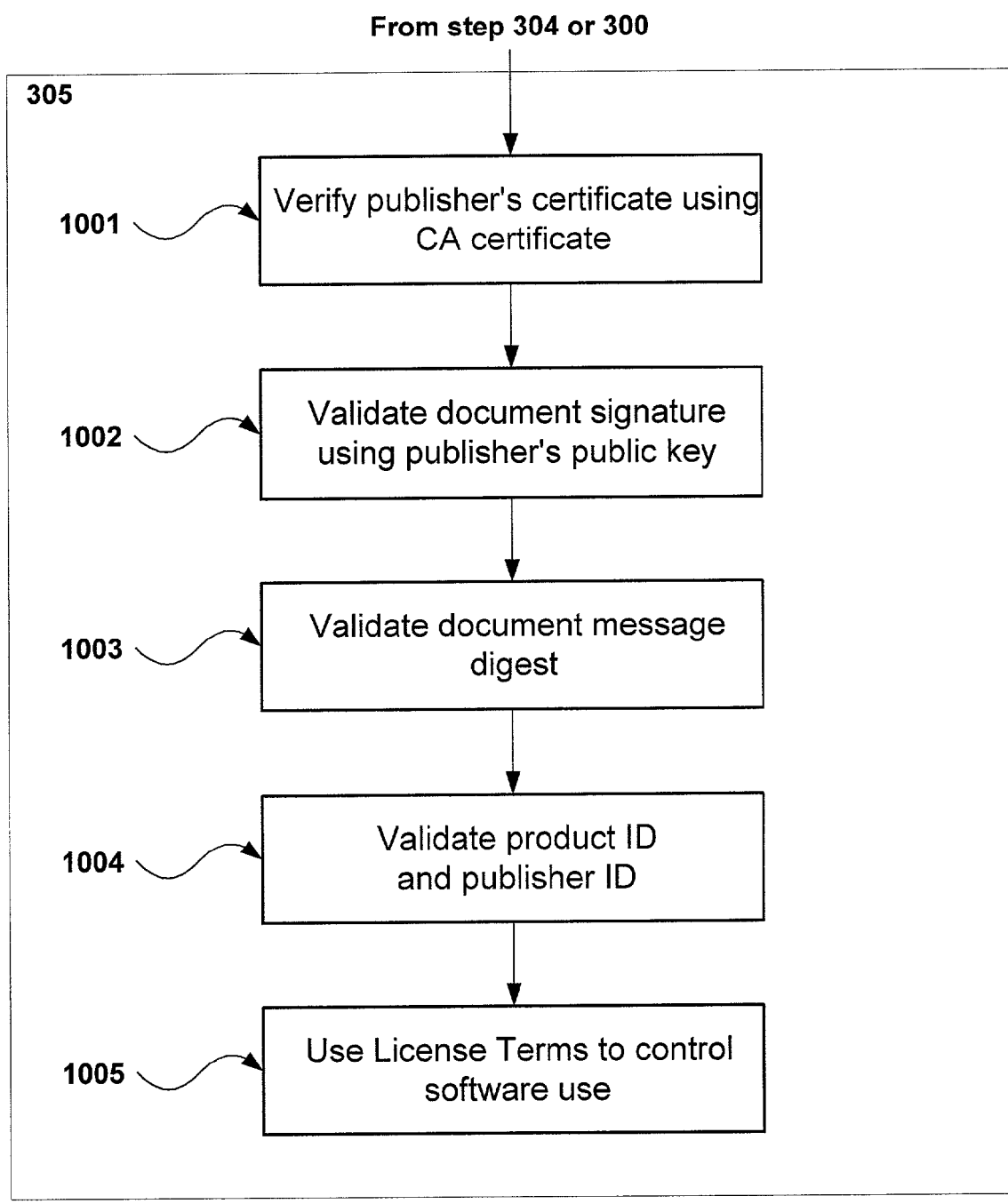
FIG. 10 is a flow diagram showing the license validation steps of the authorization program prior to authorizing use of the software program.

Referring now to FIG. 10, a flow diagram showing the license validation steps of the authorization program 214 prior to authorizing use of the software product 215 is shown. In step 1001, the publisher's certificate 502 is validated using the CA certificate 504. The self-signed CA certificate can also be validated in this step. In step 1002, the signature of the document contained in SignatureValue 712 is validated, using the validated publisher's certificate 502. At this point, we have validated the message digest, but not yet the DsigObject 714. In step 1003, a message digest is generated from DsigObject 714, and compared with the value within SignedInfo 711 of document 900. If the values are the same, the message comprising DsigObject 714 has been validated. All valid licenses for any software product would validate through step 1003. In step 1004, values from within the validated DsigObject 714 are checked, including the publisher name and ID, and product name and ID. Note that one copy of the publisher ID 507 is included within the publisher certificate 502. A separate copy may be placed within DsigObject 714. The software product also contains this ID within the authorization program 214. This step ensures that a valid license exists for this product, not for some other product, and that the product is from the correct publisher.

Finally, in step 1005, the license terms contained in LicenseTerms 964 are used to control the use of the software product 215. Controlling the use of a software product from license terms is well known by those of ordinary skill in the art, and thus will not be described herein.

A process for delivery of a flexible and easy to use secure software license for controlling use of a software product has been described. This same process can also be used to license software tools that handle the required tasks of generating a license-managed software product for a software publisher/developer. This process will be described in conjunction with FIG. 11 and FIG. 12 below.

Referring now to FIG. 13, a flow diagram showing the entire chain from the creation of the toolset to the end user acquiring a license for a software product is shown. At the top of the diagram is the certificate authority 1301, who provides the service of issuing digital certificates. As described below, this may be a function provided by the toolset publisher 1302. Next is the toolset publisher 1302. Using various components 214, 1310, 1311, and 1312, a license-managed version of the toolset 1320 is produced, as described in detail below. This product is sold to the software publisher 1303, and interacts over path 1322 with the toolset license server 102a via the license request document 700 and license response document 900 described above, with one major addition. The request document 700 in this case includes a publisher certificate request, and the response document 900 contains the requested publisher certificate 502 issued by the CA 1301, along with the CA certificate 504. The toolset license server 102a must communicate with the CA 1301 over path 1321 to request that the publisher certificate be issued.

The software publisher 1303, using the license-managed toolset 1320, generates a configuration 1313 containing the newly created product public/private keyset for his software product 220, signed using his private publisher key related to the publisher certificate 502 returned via communication path 1322. The toolset 1320 then uses built-in functions and resources, the configuration data 1313, the product, publisher, and CA certificates, and the software program 215 to create a license-managed software product 220. The certificates and keys from the configuration document 1313 are used in the publisher's license server 102b, serving the same function as the toolset license server 102a except server 102b does not receive certificate requests and does not provide CA-issued certificates, as described above for server 102a.

The resulting software product 220 is used by the end user, as described in detail in conjunction with FIG. 1 through FIG. 10 above, with the license request 700 and license response 900 being exchanged via path 1331. This results in the end user having licensed access to the software product. The details of the software publisher and user interaction have been described above in some detail. The CA 1301 to toolset publisher 1302 to software publisher 1303 interaction summarized above in conjunction with FIG. 13 is described in detail below, in conjunction with FIG. 11 and FIG. 12.

Figure 11:
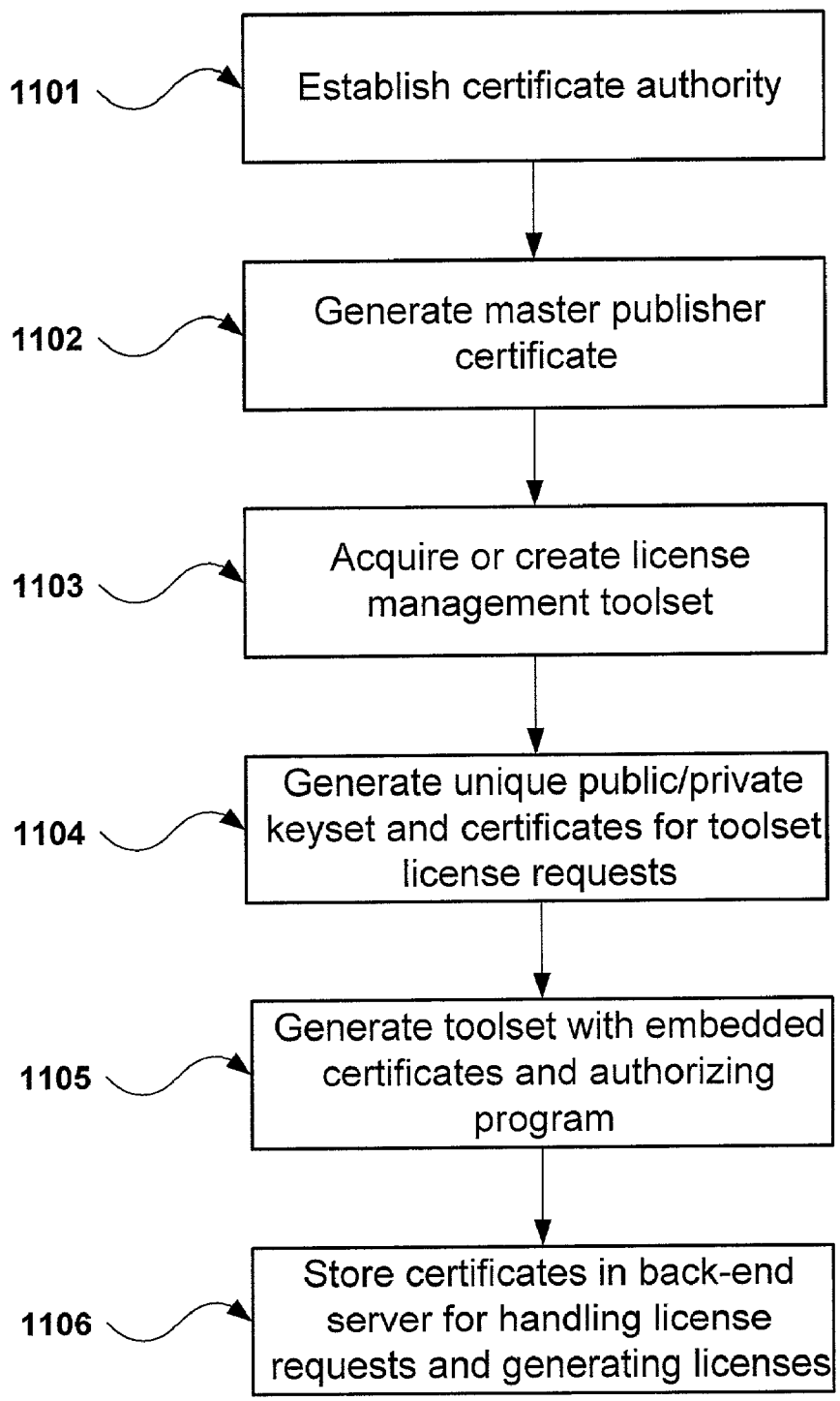
FIG. 11 is a flow diagram showing the steps of creating a toolset for developers to use to create license-managed versions of their software programs.

Referring now to FIG. 11, a flow diagram showing the steps of creating a toolset for developers to use for creating license-managed versions of their software products. This process begins with step 1101, in which a certificate authority 1301 is established. The certificate authority 1301 can be an already established certificate authority, such as VeriSign, a new certificate authority set up for servicing this specific business, or can be the software toolset publisher itself. Setting up a certificate authority requires a level of security to protect private keys and generate certificates, as well as means for validating the certificate requesters identity. The certificate authority begins by issuing their own "root" certificate, which is "self-signed"—i.e., is signed by the private key associated with the public key available within the certificate. Setting up a certificate authority is a well known process to those of ordinary skill in the art, and will not be described in more detail herein.

In step 1102, the toolset provider 1302 creates a keyset—a public and private key pair—and requests and receives a certificate from the certificate authority. This certificate, signed by the CA, is the master publisher's certificate, and is used in a similar manner to the publisher's certificate 502 in the toolset authorization program 1310. The private key is kept secret, and is available to the back-end server 102a for handling toolset license requests from software publishers 1303 who want to use the toolset 1320 to create license-managed versions of their software products.

In step 1103, the toolset 1314 for generating license-managed versions of software products is acquired or created for use in this process. This includes authorization program 214 Next, in step 1104, a unique keyset and certificate is created for toolset license requests. The certificate is signed using the private master publisher's key, and thus can be verified using the available master publisher's certificate containing the public key. This keyset serves the same function as the product keyset 503 and 505 described earlier, but in this case, is associated with the toolset product itself rather than products generated using the toolset. The certificates and keys 1312 includes the toolset license request certificate 503 and private key 505, the master publisher certificate 502 and private key, and the CA certificate 504.

In step 1105, the toolset in product form 1320, incorporating the toolset authorization program 1310 and embedded certificates and related ID's 1312 is generated. This usually requires hand-coding or even creating a custom version of the toolset to generate the license-managed product version of the toolset 1320. Of course a copy of the authorization program 214 must be included, since this code is added to the publisher/developer software product 215 when the tool operates. The toolset authorizing program 1310 and the authorizing program 214 are slightly different, as described below.

Finally, the license server 102a is created in step 1106, and provided with the required private key from the master publisher keyset for handling license requests for the toolset, and for generating licenses responses optionally in conjunction with financial transactions. The toolset generated in step 1105 and the server created in step 1106 are now used to provide a license-managed toolset 1320, offered for sale to software developers/publishers 1303, and using a similar system as described above for providing a license-managed software product 215 for sale to end users.

One of the key differences in the authorization program 1310 used by the toolset and the authorization program 214 used as part of the end-user licensed software 215 is the use of the CertificateSignRequest 751 object in the license request 700 document over path 1322. In the case of the toolset version, it is necessary to generate the publisher's certificate 502 for use with the toolset. It is not necessary for an end-user to have a certificate, and thus this function is left out of the authorization program 214, which uses communication path 1331

To create a certificate for the publisher, a keyset is generated by the authorization program 1310, assuming one does not already exist. This step occurs the first time the toolset is used, as part of the license request process managed by the authorization program in the toolset. The private key is provided to the developer/publisher 1303 for their use on their back-end server 102b, and for signing licenses for their end users. The public key is sent within the CertificateSignRequest 751 over communication path 1322. This public key is then turned into a certificate by the CA, signed by the CA private key, and returned to the publisher in the certificate 951 object of the response document 900 over communication path 1322. Of course this certificate is only generated after the master publisher has requested a certificate from the CA over path 1321. After the CA has verified the information within the request document 700, a certificate is issued back to the master publisher 1302 over path 1321. This verification requires manual intervention, such as telephone calls, and other means for verifying someone's identity. This is a critically important step if the trust relationship of the CA is to be effective. The resulting certificate is returned to the developer/publisher 1303 embedded within the license response 700 document over path 1322.

Figure 12:
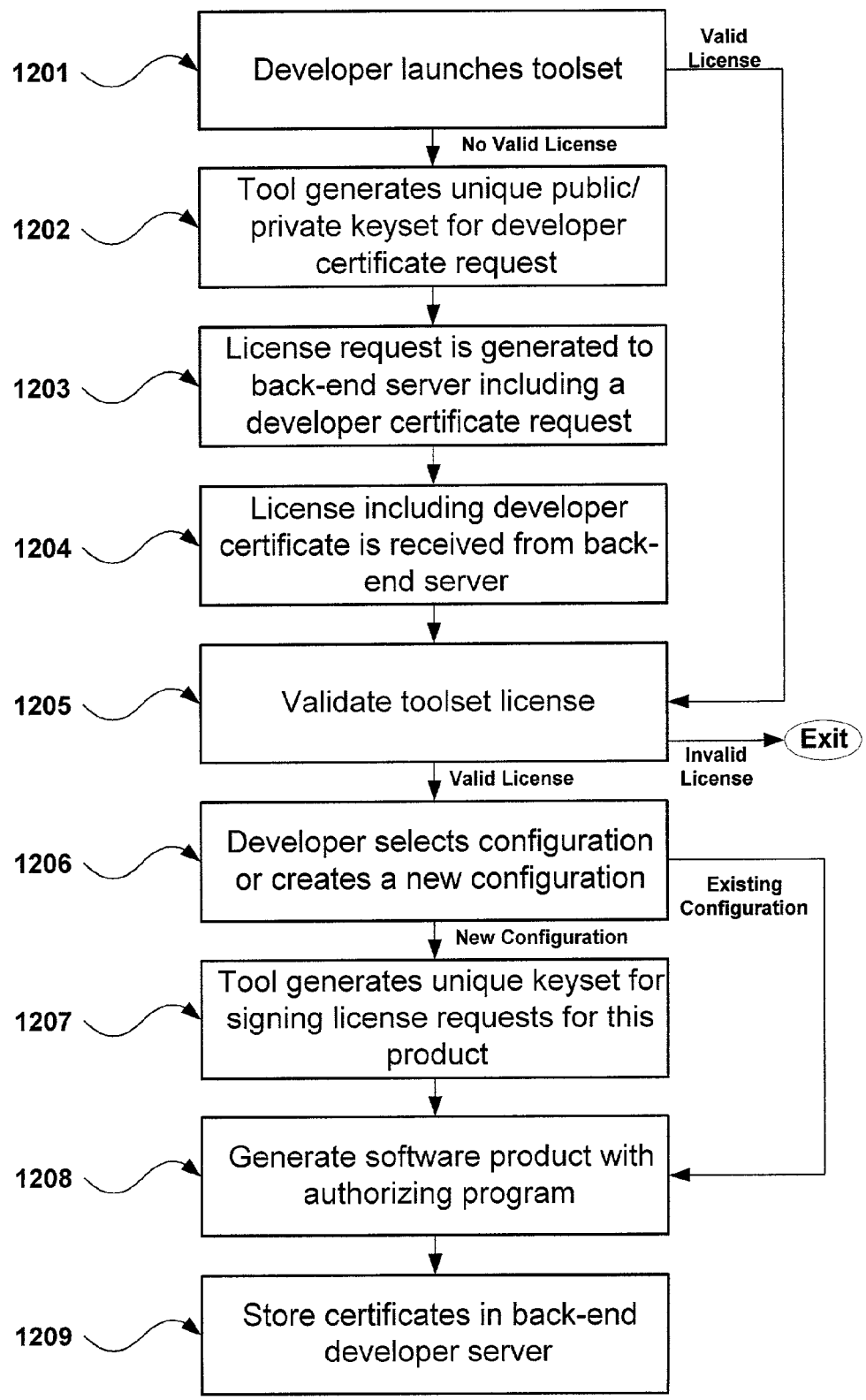
FIG. 12 is a flow diagram showing the developers use of the license management toolset to create a license-managed version of their software program.

Referring now to FIG. 12, a flow diagram showing the developer's 1303 use of the license management toolset 1320 to create a license-managed version of their software product 220. Prior to this process, it is assumed that the publisher/developer 1303 has acquired a copy of the license-management toolset 1320 by some means, such as downloading from a server, or receiving a copy by mail, or other means, and has installed it on his computer. In step 1201, the developer 1303 launches the toolset. On first execution, the toolset does not find a valid license for the toolset, and thus moves to step 1202. If a valid license is discovered, the process continues with step 1205. Typically, this will be the case after the first successful completion of a license request/response interaction over path 1322.

In order to acquire a valid license, the process continues in step 1202, the toolset generates a unique public/private keyset for the publisher's certificate request. The license request 700 is generated in step 1203 as described above, with the addition of the public publisher's key placed within the CertificateSignRequest 751 object, and is sent to the master publisher's back-end server 102a over path 1322.

In step 1204, the license response 900 is received back from the license server 102a via communication path 1322, which generated the required response document as described above with the addition of having the identity of the publisher verified, and the certificate request in CertificateSignRequest 751 turned into a publisher's certificate 502. The publisher's certificate 502 is included in the certificate 951 object of the response document 900, along with a copy of the CA certificate 504. The publisher's certificate 502 includes the publisher's unique ID 507, which is used as part of the authorization program 214 information included with a license-managed software product 220 for sale to end users 1304.

In step 1205, the license found at launch time, or the license received from the license server 102a is verified according to the process described earlier. In addition to this process, the publisher's certificate is extracted from the license, for use in generating license-managed software products 220 for sale to end users 1304. Assuming the license validity is confirmed, the process continues in step 1206. Otherwise, the process loops back to step 1202 and another attempt to request a license is initiated, or the process aborts. In this case, another attempt can be initiated by relaunching the toolset.

Next, in step 1206, the developer/publisher 1303 creates a configuration 1313 to license-manage a particular software product 215. On subsequent launches of the toolset, the developer/publisher 1303 may instead select a configuration generated previously in this step. If a new configuration for a new product is created, the process continues with step 1207. If an existing configuration has been selected, the process continues with step 1208.

For a new configuration, step 1207 creates a new product keyset, from which the product certificate 503 and private product key 505 is derived. The product certificate 503 is signed by the publisher, using his private publisher's key. Thus, the product certificate 503 can be validated with the publisher's certificate 502. This product certificate 503 and product private key 505 are stored in the configuration file for use whenever the configuration is used in the future.

In step 1208, the toolset takes an existing product keyset from the configuration file 1313, along with the software product 215 itself, the end-user authorization program 214, and other required information as described in conjunction with FIG. 5, and generates the license-managed version of the software product, 220, containing the software product 215 and end-user authorization program 214, as described above.

Finally, in step 1209, the required certificates and the publisher's private key are provided to the back-end server 102b for handling the license requests 700 from end-users 1304 over path 1331, and for generating the required license response documents 900 to be returned to the user's computer over the same path. This server 102b may be provided by the developer, a third party, or by the master publisher. If supplied by the master publisher, server 102a and 102b may be the same server. Other arrangements for servers are also possible, such as dealer servers, distributor servers, and multi-tiered server systems. These arrangements are known to one of ordinary skill in the art, and will not be described in detail herein.

A method and system for securely delivering a software license for a toolset for creating licensed-managed software products has been disclosed, where one software license is used to authorize use of the toolset, and the toolset is capable of creating license-managed software products to support the licensing of the software product to end users. The present invention has a very high security because the license is tamperproof, and because of the complete chain of digital signatures all the way back to the certificate authority. This unbroken chain verifies the identity of all parties involved, through the identity checking process used by the certificate authority. Likewise, the identity of the person to which the end user license was issued can be identified through the associated financial transaction, typically by credit card. The license file—the response document 900—cannot be tampered with, without access to the secret publisher's private key. Thus, the content of the response document 900 is secure, and the license terms contained within are safe from tampering. Of course this does not prevent a hacker from attacking the authorization program 214 or the software product 215 itself, with the goal of extracting the software product 215 for use without the authorization program 214. This invention does not address this avenue of attack.

Another avenue of attack, specifically for node-locked licenses that are only allowed to run on a single computer, is a means whereby the software is fooled into thinking that it is running on the computer for which the license was issued, even when this is not the case. This conceivably could be accomplished by creating a kernel-level routine that provides false system information when the request comes from the authorization program 214. This would require a very high level of skill, and also would require knowing or discovering how the machine fingerprints are created. If done "correctly," all other programs would receive the proper information from the operating system, while the authorization program 214 would receive false information. If this was successfully accomplished, the software product 220 could be distributed with a copy of a single license, along with the kernel routine. However, it is important to note that the license contains the name and financial identity of the original license buyer, and therefore the liability for the illegal copies can be traced, at least that far. This makes it important for legitimate licensees to not provide copies of their licenses to others, lest they be charged with illegal activity if their license is used as described.

The present invention has been described in accordance with the embodiments shown, and one of ordinary skill in the art will readily recognize that there could be variations to the embodiments, and any variations would be within the spirit and scope of the present invention. In addition, software written according to the present invention may be stored on a computer-readable medium, such as a removable memory, or transmitted over a network, and loaded into the computer system for execution. Accordingly, many modifications may be made by one of ordinary skill in the art without departing from the spirit and scope of the appended claims.

What is claimed is:

1. A method for delivery of a license-managed toolset for creating a license-managed software product, the method comprising the step of:
    (a) providing an authorization process, the authorization process including the steps of:
        (i) creating a first public and private key pair for a software publisher,
        (ii) creating a second public and private key pair for a software program, wherein at least one of the second private and public keys is digitally signed by the first private key of the software publisher,
        (iii) creating an authorization program for the software program, and embedding a copy of the first and second public keys in the authorization program,
        (iv) combining the authorization program with a software program, such that when the software program is invoked on a computer, the authorization program obtains a license for the software program by:
            (1) creating a license request,
            (2) encrypting the license request using the second public key,
            (3) transmitting the encrypted license request to a key authority,
            (4) receiving an encrypted license from the key authority, wherein the license includes license terms, and
            (5) decrypting the license using the first public key, such that the license terms are used to control use of the software program;
    (b) implementing the authorization process in a software toolset that is provided by a toolset publisher, wherein when the authorization process is invoked in the software toolset, the toolset publisher is the publisher in the authorization process and the software toolset is the software program in the authorization process, and
    (c) implementing the authorization process in a software product that is provided by a publisher of the software product using the software toolset, wherein when the authorization process is invoked in the software product, the publisher of the software product is the publisher in the authorization process and the software product is the software program in the authorization process, whereby both the software toolset and the software product use the same authorization process to obtain respective licenses.

2. The method of claim 1 further includes the step of transferring the first and second private keys to a key authority for receiving license requests and generating licenses.

3. The method of claim 1 further includes the step of including product and customer information within the license request and license documents.

4. The method of claim 1 further includes the step of associating the license request with a financial transaction, and incorporating financial transaction information within the license.

5. The method of claim 1 further includes the steps of:
    (a) assigning a publisher ID to the publisher,
    (b) embedding the publisher ID within the authorization program,
    (c) including the publisher ID within the license, and
    (d) comparing the embedded publisher ID with the publisher ID within the license to verify the publisher of the software program to be authorized has generated the license.

6. The method of claim 1 further including the steps of:
    (a) generating a machine fingerprint within the authorization process,
    (b) incorporating the machine fingerprint within the license request,
    (c) incorporating the machine fingerprint within the license terms, and
    (d) using by the authorization program the machine fingerprint to prevent use of the software product on a different machine than the one which made the license request.

7. A method for delivery of a license-managed toolset for creating a license-managed software product, the method comprising the step of:
    (a) providing an authorization process, the authorization process including the steps of:
        (i) creating a first public and private key pair for a software publisher, and creating a first certificate with the public key using a certificate authority,
        (ii) creating a second public and private key pair for a software program, and creating a second certificate with the software publisher private key, wherein at least one of the second private and public keys is digitally signed by the first private key of the software publisher, (iii) creating an authorization program for the software program, and embedding a copy of the first and second certificates and second private key in the authorization program, (iv) combining the authorization program with a software program, such that when the software program is invoked on a computer, the authorization program obtains a license for the software program by:

(1) creating a formatted license request, (2) signing the formatted license request using the second public key, (3) transmitting the signed formatted license request to a key authority, (4) receiving an signed formatted license from the key authority, wherein the license includes license terms, and (5) validating the license using the first certificate, such that the license terms are used to control use of the software program;

(b) implementing the authorization process in a software toolset that is provided by a toolset publisher, wherein when the authorization process is invoked in the software toolset, the toolset publisher is the publisher in the authorization process and the software toolset is the software program in the authorization process, and (c) implementing the authorization process in a software product that is provided by a publisher of the software product using the software toolset, wherein when the authorization process is invoked in the software product, the publisher of the software product is the publisher in the authorization process and the software product is the software program in the authorization process, whereby both the software toolset and the software product use the same authorization process to obtain respective licenses.

8. The method of claim 7 further includes the step of including product and customer information within the license request and license documents.

9. The method of claim 7 further includes the step of associating the license request with a financial transaction, and incorporating financial transaction information within the license.

10. The method of claim 7 further includes the step of formatting the license request and license using a proposed signed XML document format.

11. The method of claim 7 further includes the step of generating the first public and private key pair for the software product publisher during the authorization process for the toolset, using the steps of:

(a) creating the first public and private key pair for the software publisher prior to using the authorization process for the toolset;

(b) including the public key within the license request document in the form of a certificate request;

(c) receiving the certificate within the license document, and (d) using the received certificate in conjunction with the private key as the first key pair in the authorization process for the software product.

12. The method of claim 7 further includes the step of transferring the first and second private keys and certificates to a key authority for receiving license requests and generating licenses.

13. The method of claim 7 further includes the steps of:

(a) assigning a publisher ID to the publisher, (b) including the publisher ID within the publisher certificate, included within the software product license, (c) embedding the publisher ID within the authorization program, (d) comparing the embedded publisher ID with the publisher ID within the certificate to verify the publisher of the software program to be authorized has generated the license.

14. The method of claim 7 further including the steps of:

(a) generating a machine fingerprint within the authorization process, (b) incorporating the machine fingerprint within the license request, (c) incorporating the machine fingerprint within the license terms, and using by the authorization program the machine fingerprint to prevent use of the software product on a different machine than the one which made the license request.

* * * * *